US012579273B2

(12) United States Patent
Yamamoto et al.

(10) Patent No.: US 12,579,273 B2
(45) Date of Patent: Mar. 17, 2026

(54) INFORMATION PROCESSING APPARATUS, INFORMATION PROCESSING METHOD, AND NON-TRANSITORY COMPUTER READABLE MEDIUM FOR VERIFYING SOFTWARE

(71) Applicant: Mitsubishi Electric Corporation, Tokyo (JP)

(72) Inventors: Takahiro Yamamoto, Tokyo (JP); Yoshiaki Katayama, Tokyo (JP); Yosuke Yokoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 18/525,386

(22) Filed: Nov. 30, 2023

(65) Prior Publication Data

US 2024/0104219 A1 Mar. 28, 2024

Related U.S. Application Data

(63) Continuation of application No. PCT/JP2021/027424, filed on Jul. 21, 2021.

(51) Int. Cl.
*G06F 21/57* (2013.01)
*G06F 21/51* (2013.01)
*G06F 21/64* (2013.01)

(52) U.S. Cl.
CPC ............ *G06F 21/575* (2013.01); *G06F 21/51* (2013.01); *G06F 21/64* (2013.01)

(58) Field of Classification Search
CPC ......... G06F 21/575; G06F 21/51; G06F 21/64
See application file for complete search history.

(56) References Cited

U.S. PATENT DOCUMENTS 9,904,806 B2 2/2018 Ju
10,878,096 B2 * 12/2020 Fu ......................... G06F 9/4401
(Continued)

FOREIGN PATENT DOCUMENTS

DE 11 2018 007 934 T5 5/2021
EP 3 474 179 A1 4/2019
(Continued)

OTHER PUBLICATIONS

International Search Report for PCT/JP2021/027424 (PCT/ISA/210) mailed on Sep. 14, 2021.
German Office Action for German Application No. 112021007690.6, dated Sep. 19, 2024, with an English translation.

*Primary Examiner* — Jaweed A Abbaszadeh
(74) *Attorney, Agent, or Firm* — Birch, Stewart, Kolasch & Birch, LLP

(57) ABSTRACT

An information processing apparatus (100) includes a validity verification unit (101). The validity verification unit (101) verifies validity of startup software by comparing verification subject data which is data for verification calculated based on data stored in a storage place indicated in startup record data indicating the storage place where the startup software executed at startup of the information processing apparatus (100) is to be stored, and which is data for verification calculated at the startup of the information processing apparatus (100), with comparison data which is data for verification calculated before the startup of the information processing apparatus (100) based on the startup software, and which is data for verification used as a comparison subject of the verification subject data.

10 Claims, 11 Drawing Sheets

(56)     References Cited

U.S. PATENT DOCUMENTS

| | | | | | |
|---|---|---|---|---|---|
| 2007/0226518 | A1* | 9/2007 | Yasaki | ................. | G06F 21/575 |
| | | | | | 713/189 |
| 2010/0268967 | A1* | 10/2010 | Senda | .................. | G06F 21/575 |
| | | | | | 713/193 |
| 2013/0091324 | A1* | 4/2013 | Kato | ....................... | G06F 21/64 |
| | | | | | 711/E12.001 |
| 2013/0091394 | A1 | 4/2013 | Kato | | |
| 2016/0306976 | A1* | 10/2016 | Gantman | ................ | G06F 21/44 |
| 2017/0255384 | A1 | 9/2017 | Hashimoto et al. | | |
| 2019/0114429 | A1 | 4/2019 | Shimizu | | |
| 2019/0325138 | A1* | 10/2019 | Ishikawa | .............. | G06F 21/572 |
| 2019/0392149 | A1* | 12/2019 | Yamashita | ............. | G06F 21/57 |
| 2020/0401688 | A1* | 12/2020 | Michishita | ............. | G06F 21/57 |
| 2021/0192014 | A1* | 6/2021 | Yamaguchi | ........... | H04L 9/3247 |
| 2021/0232690 | A1* | 7/2021 | Nomura | ................ | G06F 21/572 |
| 2022/0113990 | A1* | 4/2022 | Tagashira | ............ | G06F 9/44505 |

FOREIGN PATENT DOCUMENTS

| | | | |
|---|---|---|---|
| JP | 2013-84078 | A | 5/2013 |
| JP | 2014-21953 | A | 2/2014 |
| JP | 2015-22521 | A | 2/2015 |
| JP | 2017-33248 | A | 2/2017 |
| JP | 2017-156945 | A | 9/2017 |
| JP | 2017-208859 | A | 11/2017 |
| JP | 2018-195329 | A | 12/2018 |
| JP | 2019-75000 | A | 5/2019 |
| JP | 2020-72431 | A | 5/2020 |
| JP | 2020-173597 | A | 10/2020 |
| JP | 2020-187504 | A | 11/2020 |
| WO | WO 2020/075303 | A1 | 4/2020 |

* cited by examiner

Fig. 2

| START ADDRESS | SOFTWARE SIZE |
|---|---|
| 00100000 | 50 |
| 00500000 | 120 |
| 01000000 | 90 |

| START ADDRESS | SOFTWARE SIZE | DATA FOR VERIFICATION |
|---|---|---|
| 00100000 | 50 | 37be8a26···· |
| 00500000 | 120 | fa632e39···· |
| 01000000 | 90 | 8d10abcf···· |

Figure 4:
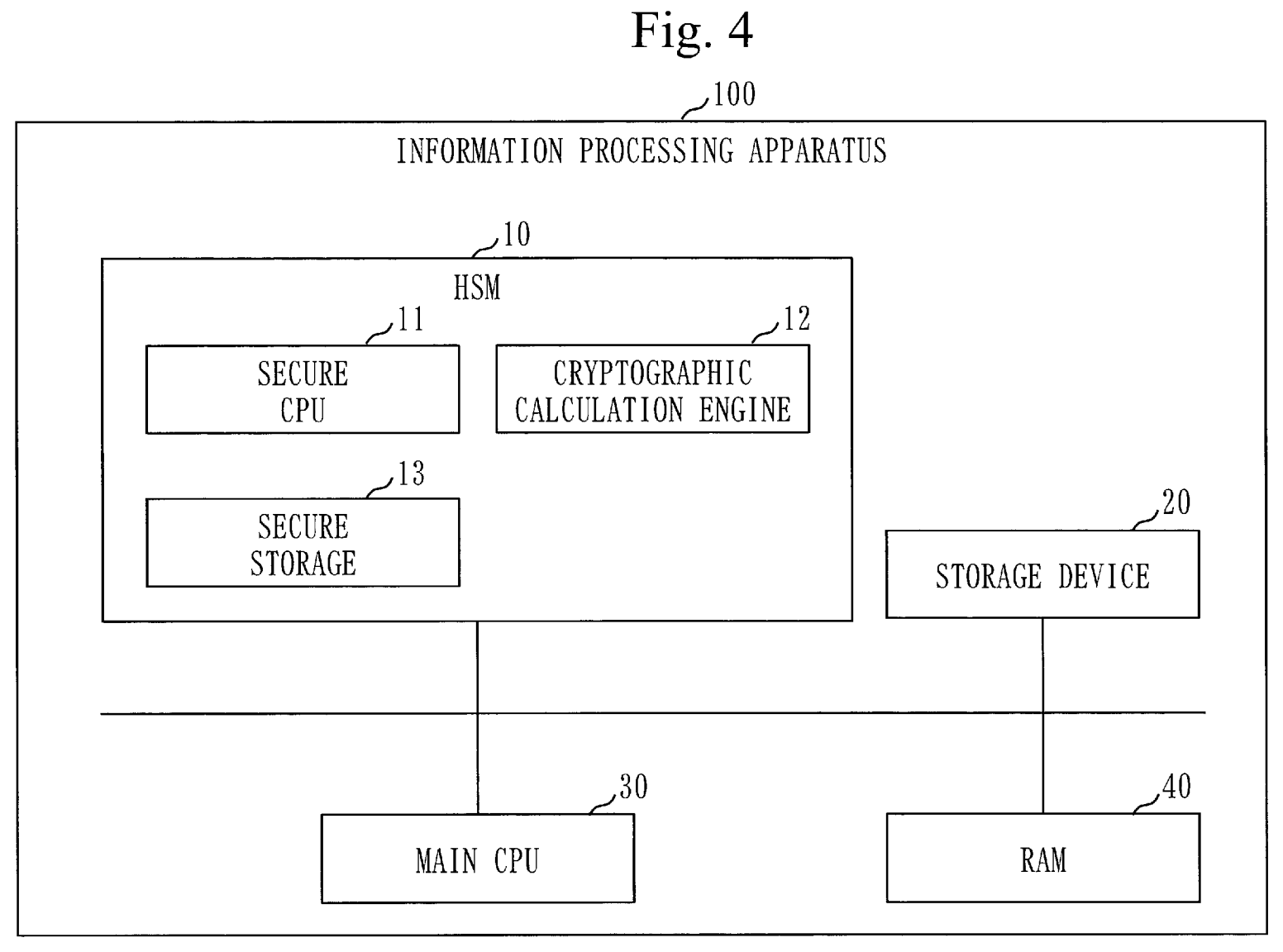

INFORMATION PROCESSING APPARATUS

STORAGE DEVICE 20

RAM 40

HSM 10

CRYPTOGRAPHIC CALCULATION ENGINE 12

SECURE CPU 11

SECURE STORAGE 13

MAIN CPU 30

Fig. 10

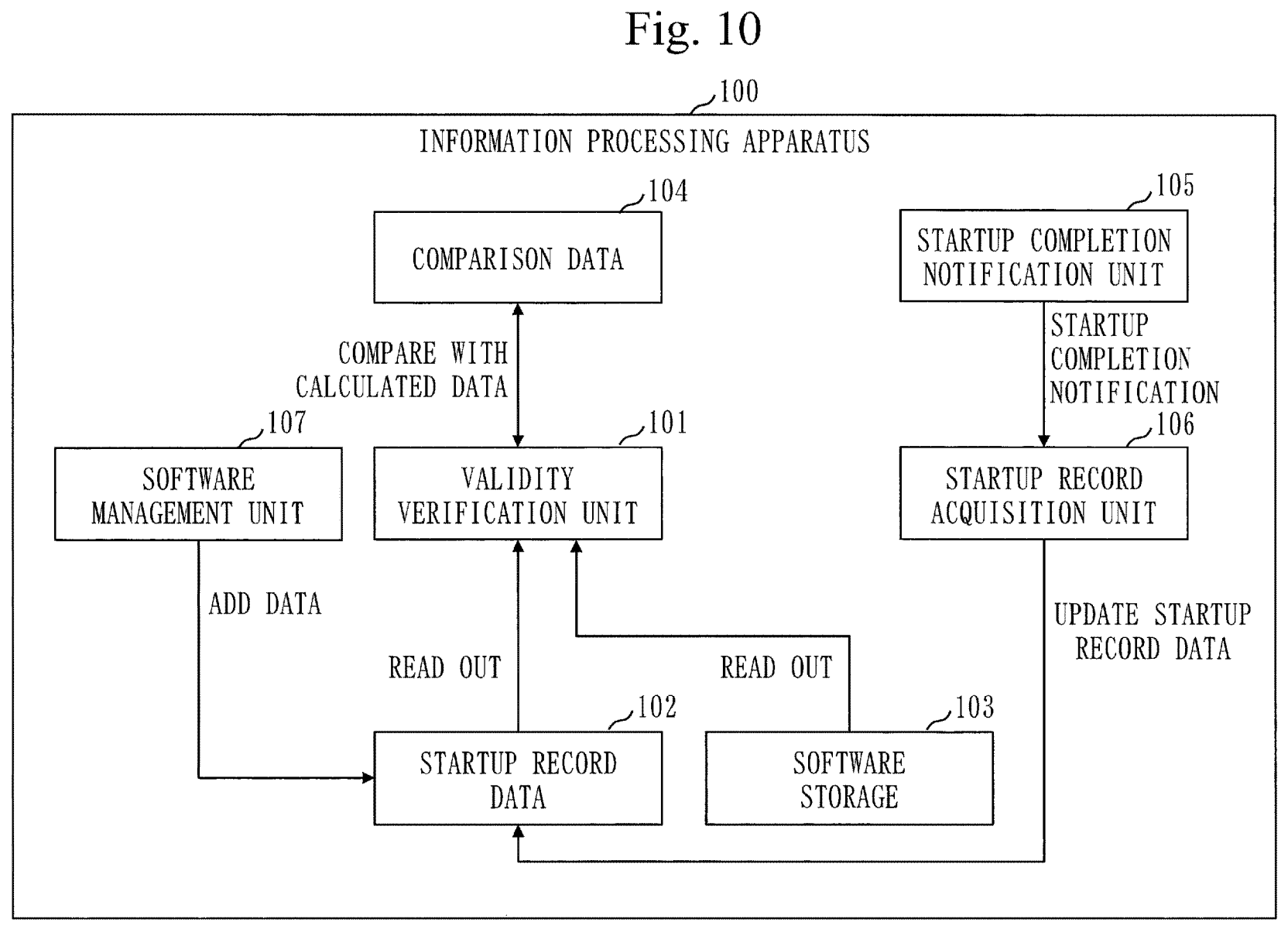

INFORMATION PROCESSING APPARATUS 100

STARTUP COMPLETION NOTIFICATION UNIT 105

STARTUP COMPLETION NOTIFICATION

STARTUP RECORD ACQUISITION UNIT 106

UPDATE STARTUP RECORD DATA

COMPARISON DATA 104

COMPARE WITH CALCULATED DATA

VALIDITY VERIFICATION UNIT 101

READ OUT

SOFTWARE STORAGE 103

SOFTWARE MANAGEMENT UNIT 107

ADD DATA

READ OUT

STARTUP RECORD DATA 102

INFORMATION PROCESSING APPARATUS, INFORMATION PROCESSING METHOD, AND NON-TRANSITORY COMPUTER READABLE MEDIUM FOR VERIFYING SOFTWARE

CROSS REFERENCE TO RELATED APPLICATION

This application is a Continuation of PCT International Application No. PCT/JP2021/027424, filed on Jul. 21, 2021, which is hereby expressly incorporated by reference into the present application.

TECHNICAL FIELD

The present disclosure relates to an information processing apparatus, an information processing method, and an information processing program.

BACKGROUND ART

Patent Literature 1 discloses a technique relating to verification of validity of software at startup of an information processing apparatus. In this technique, first, an area to be verified is decided in advance, a hash value or the like in the area to be verified is calculated, and the calculated hash value or the like is saved as a comparison subject. Then, at the startup of the information processing apparatus, a hash value or the like in the area to be verified is recalculated, and the recalculated hash value or the like is compared with the hash value or the like saved as the comparison subject. If these are consistent with each other, it is determined that the description has not been changed in the area to be verified.

CITATION LIST

Patent Literature

Patent Literature 1: JP 2013-084078 A

SUMMARY OF INVENTION

Technical Problem

According to the technique disclosed in Patent Literature 1, validity of all software in the information processing apparatus is verified at the startup of the information processing apparatus. Therefore, there is a problem in that it takes time to verify the validity. Since the information processing apparatus often has a restriction relating to a startup time, the restriction relating to the startup time may not be satisfied if it takes time to verify the validity.

The present disclosure aims to reduce a time required for verification of validity of software, by treating only software executed at a startup time, as a verification subject of validity.

Solution to Problem

An information processing apparatus according to the present disclosure that verifies software includes a validity verification unit to verify validity of startup software by comparing verification subject data which is data for verification calculated based on data stored in a storage place indicated in startup record data indicating the storage place where the startup software executed at startup of the information processing apparatus is to be stored, and which is data for verification calculated at the startup of the information processing apparatus, with comparison data which is data for verification calculated before the startup of the information processing apparatus based on the startup software, and which is data for verification used as a comparison subject of the verification subject data.

Advantageous Effects of Invention

According to the present disclosure, only software stored in a storage place indicated in startup record data is treated as a verification subject of validity. Therefore, according to the present disclosure, a time required for verification of validity of software can be reduced, by treating only software executed at startup, as the verification subject of validity.

BRIEF DESCRIPTION OF DRAWINGS

FIG. 2 is a diagram illustrating a specific example of startup record data 102 according to Embodiment 1.

FIG. 3 is a diagram illustrating a specific example of comparison data 104 according to Embodiment 1.

FIG. 4 is a diagram illustrating a hardware configuration example of the information processing apparatus 100 according to Embodiment 1.

FIG. 10 is a diagram illustrating a configuration example of the information processing apparatus 100 according to Embodiment 3.

DESCRIPTION OF EMBODIMENTS

Figure 1:
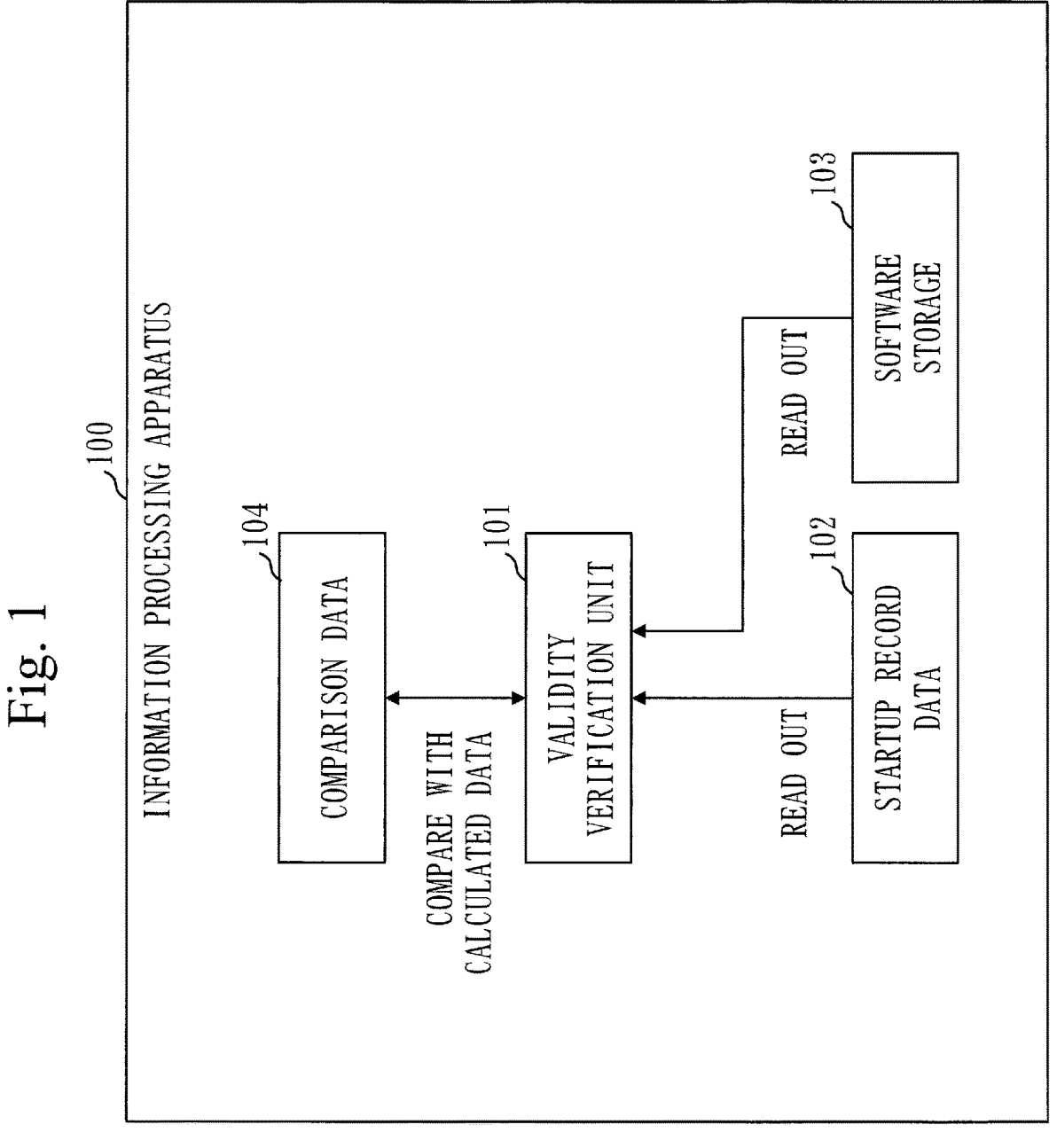
FIG. 1 is a diagram illustrating a configuration example of an information processing apparatus 100 according to Embodiment 1.

In the description and drawings of embodiments, the same elements and corresponding elements are denoted by the same reference sign. The description of elements denoted by the same reference sign will be suitably omitted or simplified. Arrows in the drawings mainly indicate flows of data or flows of processing. Further, "unit" may be suitably interpreted as "circuit", "step", "procedure", "process", or "circuitry".

Embodiment 1

The present embodiment will be described in detail below with referring to the drawings.

*Description of Configuration*

FIG. 1 illustrates a configuration example of an information processing apparatus 100 according to Embodiment 1. As illustrated in FIG. 1, the information processing apparatus 100 includes a validity verification unit 101 and a software storage 103, and records startup record data 102 and comparison data 104.

(Validity Verification Unit 101)

The validity verification unit 101 verifies validity of each startup software by comparing verification subject data with the comparison data 104. The startup software is software executed at startup of the information processing apparatus 100. The number of pieces of the startup software may be plural. The verification subject data is data for verification calculated based on data stored in a storage place indicated in the startup record data 102, and is data for verification calculated at the startup of the information processing apparatus 100.

Processing executed by the validity verification unit 101 at the startup of the information processing apparatus 100 will be described. First, the validity verification unit 101 reads out the startup record data 102 to decide software subject to verification. Next, the validity verification unit 101 decides an address range of the software storage 103 subject to verification, based on a start address and a software size recorded in the read-out startup record data 102, and calculates data for verification in each address range of the decided software storage 103. The start address is a leading address of an area where each startup software is stored. The software size is a data size of software. The data for verification is data for verifying validity of software, and is, as a specific example, a hash or a Message Authentication Code (MAC) in an area where software is stored. That is, the data for verification is data indicating a hash value or a MAC of software corresponding to the data for verification. Further, the data for verification calculated here is also referred to as verification subject data. Next, the validity verification unit 101 determines whether or not each of the calculated data for verification is consistent with data for comparison corresponding to each software stored in the comparison data 104. When all of the calculated data for verification is consistent with the data for comparison stored in the comparison data 104, and corresponding to each data for verification, the validity verification unit 101 assumes that the verification of validity of the startup software has completed.

(Startup Record Data 102)

FIG. 2 illustrates a specific example of the startup record data 102. As illustrated in FIG. 2, the startup record data 102 is data indicating a storage place where startup software is to be stored, and is data that records the start address and the software size of software executed at the startup of the information processing apparatus 100. The startup record data 102 is saved in the information processing apparatus 100 in advance at factory shipment or the like of the information processing apparatus 100. When software in a memory area whose address is not continuous is dividedly saved, the startup record data 102 records the start address and the software size of each fragment of the divided software.

(Software Storage 103)

The software storage 103 is a storage that stores each software executed by the information processing apparatus 100. Each software stored in the software storage 103 is classified into two types which are software executed at the startup of the information processing apparatus 100 and software not executed at the startup of the information processing apparatus 100.

(Comparison Data 104)

The comparison data 104 is data for verification calculated in advance before startup of the information processing apparatus 100, and indicates data for verification that needs to be in each startup software. Further, the comparison data 104 is data for verification used as a comparison subject to verification subject data in validity verification of software. Each data included in the comparison data 104 is data for comparison. The comparison data 104 is saved in advance in the information processing apparatus 100 at factory shipment or the like of the information processing apparatus 100. Each of the comparison data 104 and the verification subject data may be data corresponding to software not executed at the startup of the information processing apparatus 100.

FIG. 3 illustrates a specific example of the comparison data 104. As illustrated in FIG. 3, the comparison data 104 includes information indicating each of data for verification, and the start address and the software size of startup software corresponding to each data for verification. The start address and the software size are information for specifying an area where each startup software is stored.

FIG. 4 illustrates a hardware configuration example of the information processing apparatus 100. As illustrated in FIG. 4, the information processing apparatus 100 is configured with a computer that includes a Hardware Security Module (HSM) 10, a storage device 20, a main Central Processing Unit (CPU) 30, and a RAM 40. The information processing apparatus 100 may be configured with a plurality of computers.

(Description of HSM 10)

The HSM 10 is a module in which a circuit relating to security processing is packaged. The HSM 10 is, as a specific example, a module that has a function of executing cryptographic calculation using a cryptographic calculation engine 12 by a secure CPU 11, and a function of providing a tamper-resistant storage area by a secure storage 13.

(Secure CPU 11)

The secure CPU 11 is a CPU that executes processing of the HSM 10. The secure CPU 11 performs processing or the like, where the processing corresponds to a calculation order to the cryptographic calculation engine 12, an order to the secure storage 13 to store data, and an order to the HSM 10 from the main CPU 30 outside the HSM 10. Further, the validity verification unit 101 operates in the secure CPU 11.

(Cryptographic Calculation Engine 12)

The cryptographic calculation engine 12 is a circuit that performs cryptographic processing within the HSM 10 at high speed.

(Secure Storage 13)

The secure storage 13 is a storage that has tamper resistance for storing data to be protected from tampering. Specific examples of data saved in the secure storage 13 will be described below. Here, a secret key is an encryption key used when the MAC indicated in the comparison data 104 is calculated.

A program that functionally implements the validity verification unit 101
    The startup record data 102
    The comparison data 104
    The secret key (Storage Device 20)

The storage device 20 plays the role of the software storage 103, and is, as a specific example, a storage such as a Flash memory.

(Main CPU 30)

The main CPU 30 is an arithmetic circuit that takes over processing of the information processing apparatus 100, and is a CPU that implements processing of software stored in the software storage 103.

(RAM 40)

The RAM 40 is a volatile memory that records temporarily data at a time of executing software by the main CPU 30, and the like.

Any program described in the present description may be recorded on a computer readable non-volatile recording medium. The non-volatile recording medium is, as a specific example, an optical disc, or a flash memory. Any program described in the present description may be provided as a program product.

*Description of Operation*

An operational procedure of the information processing apparatus 100 is equivalent to an information processing method. Further, a program that implements operation of the information processing apparatus 100 is equivalent to an information processing program.

Figure 5:
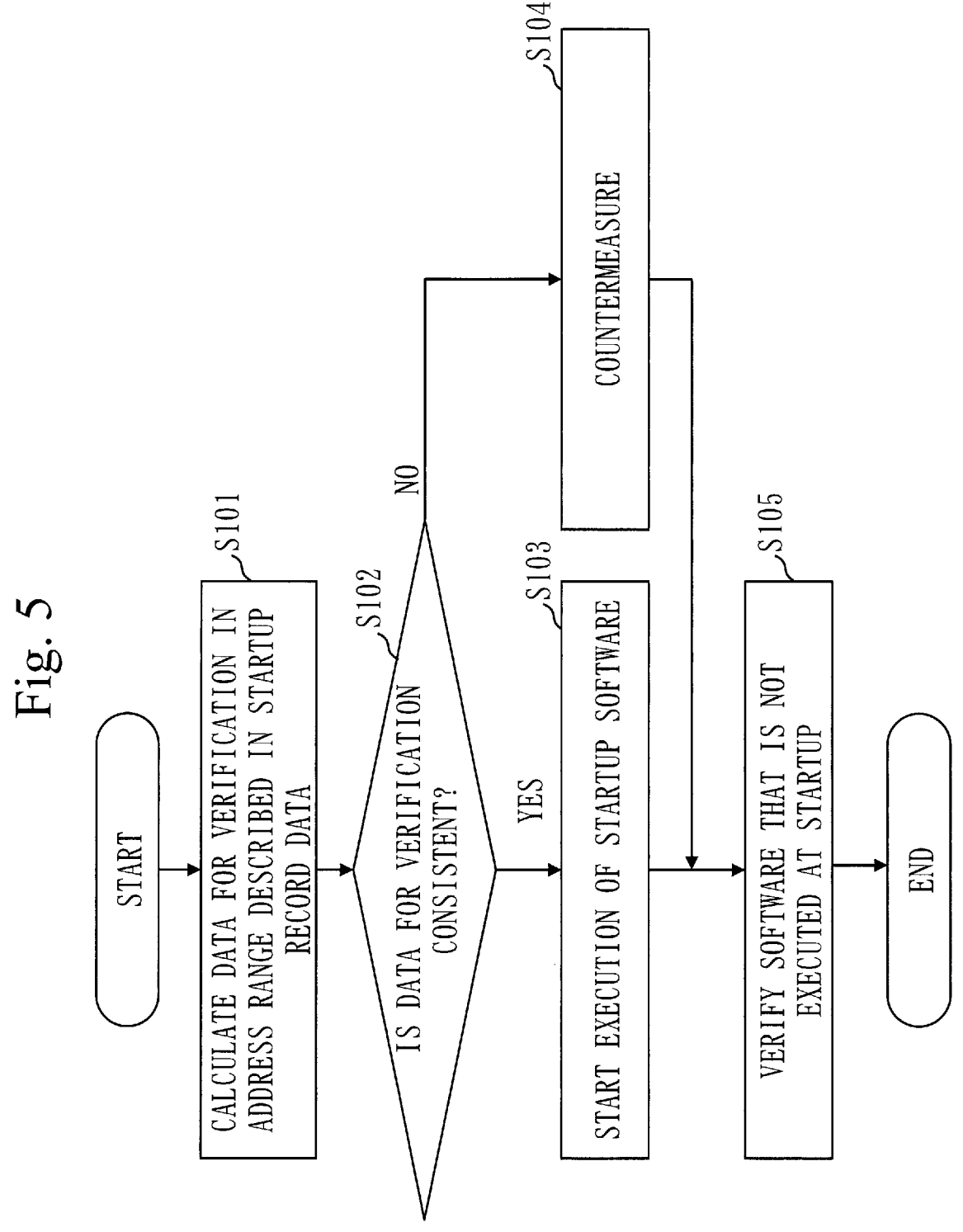
FIG. 5 is a flowchart illustrating operation of the information processing apparatus 100 according to Embodiment 1.

FIG. 5 is a flowchart illustrating an example of processing at the startup of the information processing apparatus 100 according to Embodiment 1. The processing at the startup of the information processing apparatus 100 will be described with referring to FIG. 5.

(Step S101)

When a power source of the information processing apparatus 100 is turned on by a user of the information processing apparatus 100, the validity verification unit 101 starts execution of processing.

The validity verification unit 101 decides based on the start address and the software size indicated in the startup record data 102, an address range of the software storage 103 subject to verification, and calculates data for verification using data stored in the decided address range of the software storage 103.

(Step S102)

The validity verification unit 101 compares the data for verification calculated in step S101 with the comparison data 104.

When there is at least one piece of data for verification that is not consistent with data indicated in the comparison data 104, in the calculated data for verification, the validity verification unit 101 proceeds to step S104. Otherwise, the validity verification unit 101 proceeds to step S103.

(Step S103)

The validity verification unit 101 causes the main CPU 30 to start execution of each startup software saved in the software storage 103.

After completing this step, the validity verification unit 101 proceeds to step S105.

(Step S104)

The validity verification unit 101 makes a countermeasure. As a specific example, the countermeasure is considered to cause the information processing apparatus 100 not to execute software corresponding to data for verification that is not consistent with data indicated in the comparison data 104, but to execute only software corresponding to the data for verification that is consistent with the data indicated in the comparison data 104.

(Step S105)

The validity verification unit 101 verifies validity of software not executed at the startup of the information processing apparatus 100.

*Description of Effects of Embodiment 1*

By the above operation, at the startup of the information processing apparatus 100, the information processing apparatus 100 according to Embodiment 1 verifies only software executed at the startup of the information processing apparatus 100, instead of all software in the information processing apparatus 100. Therefore, according to the information processing apparatus 100 according to Embodiment 1, the number of pieces of software that is verified validity can be reduced. As a result, the size of software that is verified the validity can be reduced. In general, a time spent on the verification of the validity is proportional to the size of software. Therefore, the time spent on the verification of the validity can be reduced by reducing the size of software that is verified the validity.

Further, entire software subject to verification is verified by calculating a hash and the like in an area where the software subject to verification is stored. Therefore, even if only a part of the software is in a tampered range, tampering to the software subject to verification can be detected.

Further, the information processing apparatus 100 according to the present embodiment is suitable for use in a vehicle control apparatus, as a specific example. An apparatus used as the vehicle control apparatus has a restriction relating to a startup time. When the software size in the vehicle control apparatus is large, there is a risk of not satisfying the restriction relating to the startup time if a validity verification process for all software in the vehicle control apparatus is performed at startup of the vehicle control apparatus.

However, when the information processing apparatus 100 according to Embodiment 1 is used as the vehicle control apparatus, the risk of not satisfying the restriction relating to the startup time is reduced.

*Other Configurations*

<Modification 1>

Figure 6:
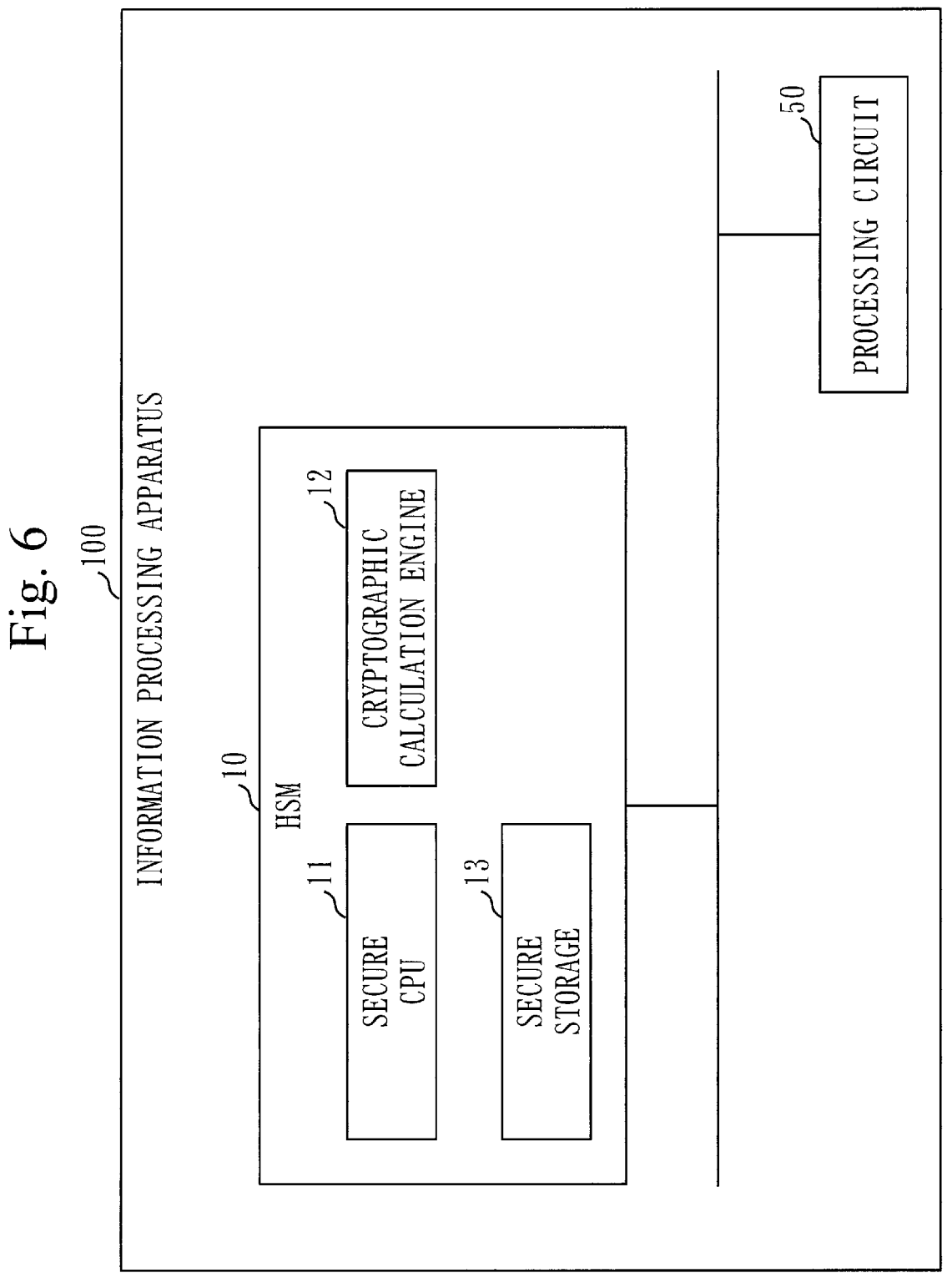
FIG. 6 is a diagram illustrating a hardware configuration example of the information processing apparatus 100 according to a modification of Embodiment 1.

FIG. 6 illustrates a hardware configuration example of the information processing apparatus 100 according to the present modification.

The information processing apparatus 100 includes a processing circuit 50 in place of the main CPU 30, the main CPU 30 and the RAM 40, the main CPU 30 and the storage device 20, or the main CPU 30, RAM 40 and the storage device 20.

The processing circuit 50 is hardware that implements at least part of each unit included in the information processing apparatus 100. The processing circuit 50 may implement the function of the HSM 10.

The processing circuit 50 may be dedicated hardware, or may be a processor that executes programs stored in the RAM 40.

When the processing circuit 50 is the dedicated hardware, the processing circuit 50 is, as a specific example, a single circuit, a composite circuit, a programmed processor, a parallel-programmed processor, an Application Specific Integrated Circuit (ASIC), a Field Programmable Gate Array (FPGA), or a combination of these.

The information processing apparatus 100 may include a plurality of processing circuits as an alternative to the processing circuit 50. The plurality of processing circuits share the role of the processing circuit 50.

In the information processing apparatus 100, some functions may be implemented by dedicated hardware, and the remaining functions may be implemented by software or firmware.

The processing circuit 50 is implemented by, as a specific example, hardware, software, firmware, or a combination of these.

The main CPU 30, the RAM 40, the storage device 20, and the processing circuit 50 are collectively referred to as "processing circuitry". That is, the functions of the individual functional components of the information processing apparatus 100 are implemented by the processing circuitry.

The information processing apparatus 100 according to other embodiments may also have the same configuration as that of the present modification.

Embodiment 2

Differences from the above-described embodiment will be mainly described below with referring to the drawings.
*Description of Configuration*

In Embodiment 1, it is assumed that the startup record data 102 is saved in advance in the information processing apparatus 100 at factory shipment or the like of the information processing apparatus 100. However, when there is a change in a configuration of startup software caused by such as installation or update of the startup software after the factory shipment or the like, the installed or updated startup software also starts execution at the startup of the information processing apparatus 100, but the startup record data 102 saved in advance is not able to correspond to the installed or updated startup software. Software relating to a configuration change in startup software after factory shipment or the like, such as startup software installed after the factory shipment or the like or startup software updated after the factory shipment or the like, is collectively referred to as changed startup software.

Then, the information processing apparatus 100 according to Embodiment 2 responds to the changed startup software by acquiring the startup record data 102 at the startup of the information processing apparatus 100.

When the configuration of the startup software is changed, it is necessary to calculate data for verification of the changed startup software, and to update the comparison data 104 using the calculated data for verification. Regarding the update of the comparison data 104, the information processing apparatus 100 may calculate the data for verification when the changed startup software is installed, updated, or the like, and may add the calculated data for verification to the comparison data 104. Alternatively, the data for verification is added in advance to the changed startup software, and the information processing apparatus 100 may add the added data for verification to the comparison data 104 when the changed startup software is installed, updated, or the like.
[Description of Additional Configuration Components in Embodiment 2]

Figure 7:
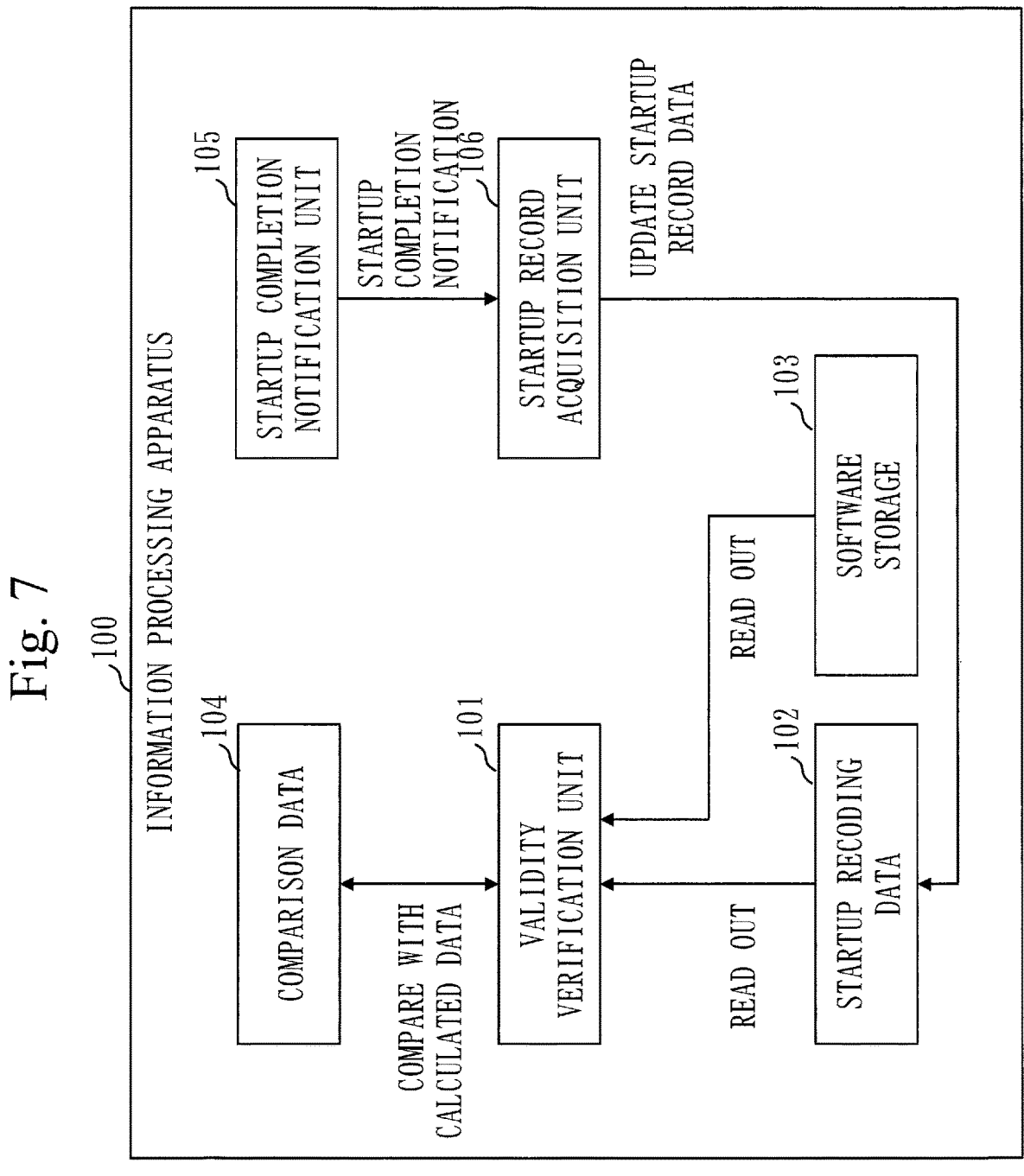
FIG. 7 is a diagram illustrating a configuration example of the information processing apparatus 100 according to Embodiment 2.

FIG. 7 illustrates a configuration example of the information processing apparatus 100 according to Embodiment 2. The functions added in Embodiment 2 will be mainly described below.
(Startup Completion Notification Unit 105)

A startup completion notification unit 105 is executed after completing the validity verification process to startup software. When the startup completion notification unit 105 detects that startup software whose execution is to be started last among pieces of each startup software has been executed, the startup completion notification unit 105 transmits to a startup record acquisition unit 106, a startup completion notification indicating that startup of the startup software has completed.
(Startup Record Acquisition Unit 106)

The startup record acquisition unit 106 is executed after completing the validity verification process to startup software. The startup record acquisition unit 106 records the start address and the software size of software whose execution has been started from immediately after the validity verification unit 101 has completed the verification of validity to the startup software until the startup record acquisition unit 106 receives from the startup completion notification unit 105, a notification relating to completion of startup. That is, the startup record acquisition unit 106 acquires storage place data indicating a storage place of each software started up from startup of the information processing apparatus 100 until it is detected that software whose execution is to be started last among pieces of startup software has been executed.

When the startup completion notification unit 105 notifies the startup record acquisition unit 106 of the completion of startup, the startup record acquisition unit 106 ends recording startup software. After that, the startup record acquisition unit 106 updates the current startup record data 102 using the storage place data which is a record of the currently acquired startup software.
[Configuration Example of Hardware]

A program that functionally implements each of the startup completion notification unit 105 and the startup record acquisition unit 106 is stored in the storage device 20 and executed by the main CPU 30 in the hardware configuration illustrated in FIG. 4, as a specific example.
*Description of Operation*

Figure 8:
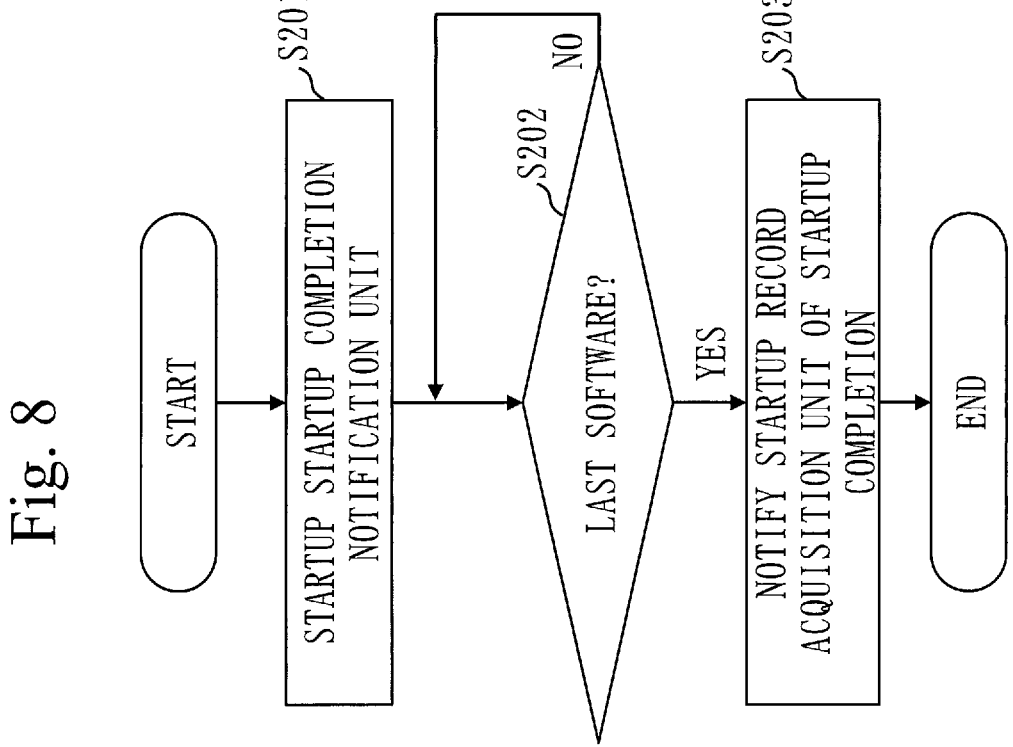
FIG. 8 is a flowchart illustrating operation of a startup completion notification unit 105 according to Embodiment 2.
Figure 9:
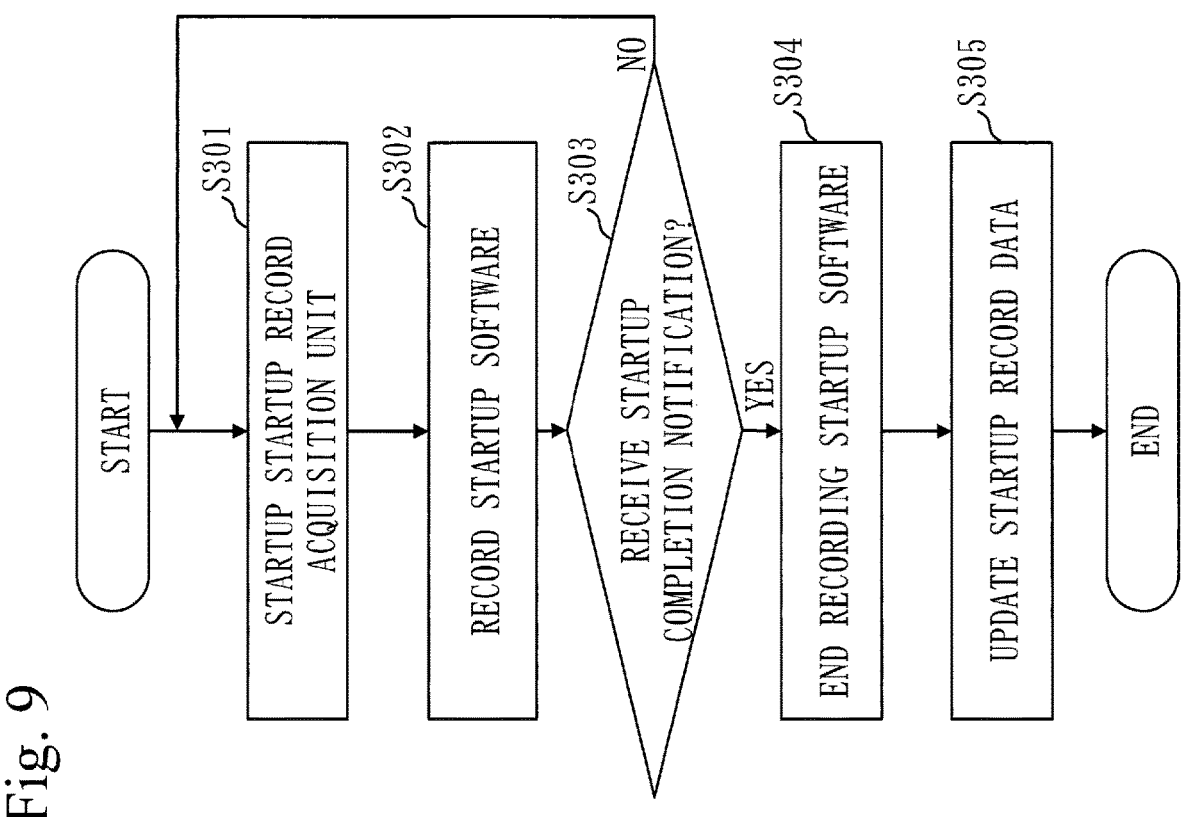
FIG. 9 is a flowchart illustrating operation of a startup record acquisition unit 106 according to Embodiment 2.

FIG. 8 is a flowchart illustrating an example of processing of the startup completion notification unit 105 according to Embodiment 2. FIG. 9 is a flowchart illustrating an example of the startup record acquisition unit 106 according to Embodiment 2. With referring to FIGS. 8 and 9, the processing of the startup completion notification unit 105 and the processing of the startup record acquisition unit 106 will be described.

The startup completion notification unit 105 and the startup record acquisition unit 106 basically operate in parallel.
[Operation of Startup Completion Notification Unit 105]
(Step S201)

Step S201 starts in a state where the validity verification process has completed, which is a state after step S103 in Embodiment 1. The main CPU starts up the startup completion notification unit 105.
(Step S202)

The startup completion notification unit 105 determines whether or not startup software whose execution has been started by the main CPU 30 is startup software whose execution is to be started last among pieces of each startup software.

When the startup software whose execution has been started is the startup software whose execution is to be started last, the startup completion notification unit 105 proceeds to step S203. Otherwise, the startup completion notification unit 105 repeats processing of step S202 until the execution of the startup software whose execution is to be started last is started.
(Step S203)

The startup completion notification unit 105 transmits the startup completion notification to the startup record acquisition unit 106.
[Operation of Startup Record Acquisition Unit 106]
(Step S301)

Step S301 starts in a state where the validity verification process has completed, which is a state after step S103 in Embodiment 1. The main CPU starts up the startup record acquisition unit 106.

(Step S302)

The startup record acquisition unit 106 records the start address and the software size of each startup software whose execution is to be started by the main CPU 30 at the startup of the information processing apparatus 100.

(Step S303)

The startup record acquisition unit 106 checks whether or not the startup completion notification has been received from the startup completion notification unit 105.

When the startup completion notification has been received, the startup record acquisition unit 106 proceeds to step S304. Otherwise, the startup record acquisition unit 106 returns to step S302, and continues to record the start address and the software size of startup software.

(Step S304)

The startup record acquisition unit 106 ends recording the start address and the software size of each startup software.

(Step S305)

The startup record acquisition unit 106 updates the startup record data 102 using the start address and the software size of each startup software recoded up to step S304.

\*\*\*Description of Effects of Embodiment 2\*\*\*

In such a case where new software is installed as startup software, or where software stored in the software storage 103 is updated, the information processing apparatus 100 according to Embodiment 2 is able to dynamically decide software subject to verification by recording the start address and the software size of software whose execution is to be started at the startup of the information processing apparatus 100.

The information processing apparatus 100 according to the present embodiment is suitable for use in a vehicle control apparatus, as a specific example. In an apparatus used as the vehicle control apparatus, it is considered to apply a technique that allows a user to execute such as installation of any software or update of software in the vehicle control apparatus via the Internet. If the technique is applied to the vehicle control apparatus, a developer of the vehicle control apparatus may not manage the configuration of software in the vehicle control apparatus. Accordingly, in the conventional validity verification method of statically deciding a verification subject and a verification order, if the user installs software that is not recognized by the developer, the software installed by the user may not be the verification subject of validity.

In the information processing apparatus 100 according to Embodiment 2, the startup record acquisition unit 106 records startup software. Accordingly, even any software installed by the user is the verification subject of validity if being executed at the startup of the information processing apparatus 100.

Embodiment 3

Differences from the above-described embodiment will be mainly described below with referring to the drawings.

\*\*\*Description of Configuration\*\*\*

When a configuration change in software is executed while the information processing apparatus 100 is in operation, the information processing apparatus 100 according to Embodiments 1 and 2 does not record software whose configuration has been changed, in the startup record data 102. Here, the configuration change in software is to change the configuration of software stored in the information processing apparatus, and is, as a specific example, to install new software in the information processing apparatus 100 or to update software stored in the information processing apparatus 100. Accordingly, software in which the configuration change has been implemented is not the verification subject of validity at the next startup of the information processing apparatus 100. However, new software or updated software in which the configuration change has been implemented, may also be the changed startup software. Consequently, if the changed startup software which is software in which the configuration change has been implemented, is tampered with, and the information processing apparatus 100 starts up while excluding the tampered changed startup software from being the verification subject of validity at the startup of the information processing apparatus 100, the information processing apparatus 100 operates without verifying validity of the tampered changed startup software.

In order to prevent a situation such as above, if the configuration change in software is executed while the information processing apparatus 100 is in operation, the information processing apparatus 100 according to Embodiment 3 has a function to execute the verification of validity to software in which the configuration change has been implemented at the startup of the information processing apparatus 100.

[Description of Additional Configuration Components in Embodiment 3]

FIG. 10 illustrates a configuration example of the information processing apparatus 100 according to the present embodiment. FIG. 10 illustrates a configuration in which a software management unit 107 is added to the information processing apparatus 100 according to Embodiment 2. However, the configuration of the information processing apparatus 100 may be a configuration in which the software management unit 107 is added to the information processing apparatus 100 according to Embodiment 1. Further, in addition to a function of calculating the data for verification, the validity verification unit 101 according to Embodiment 3 has a function to save calculated data for verification in the secure storage 13.

The functions added in Embodiment 3 will be mainly described below.

(Software Management Unit 107)

When the configuration change has been implemented to software stored in the information processing apparatus 100 while the information processing apparatus 100 is in operation, the software management unit 107 detects the software in which the configuration change has been implemented. Based on a detected result, the software management unit 107 updates the startup record data 102 and issues an order to the validity verification unit 101.

In the update of the startup record data 102, the software management unit 107 adds to the startup record data 102, the start address and the software size of the software in which the configuration change has been implemented, so that the software in which the configuration change has been implemented is the verification subject of validity at the next startup of the information processing apparatus 100.

In the issue of the order to the validity verification unit 101, since data for verification of the software in which the configuration change has been implemented is not saved as the comparison data 104, the software management unit 107 issues an order to the validity verification unit 101 to calculate the data for verification.

[Configuration Example of Hardware]

A program that functionally implements the software management unit 107 is stored in the storage device 20 in the hardware configuration illustrated in FIG. 4 and executed by the main CPU 30 in the hardware configuration illustrated in FIG. 4, as a specific example.

\*\*\*Description of Operation\*\*\*

The operation of the information processing apparatus 100 will be described.

Figure 11:
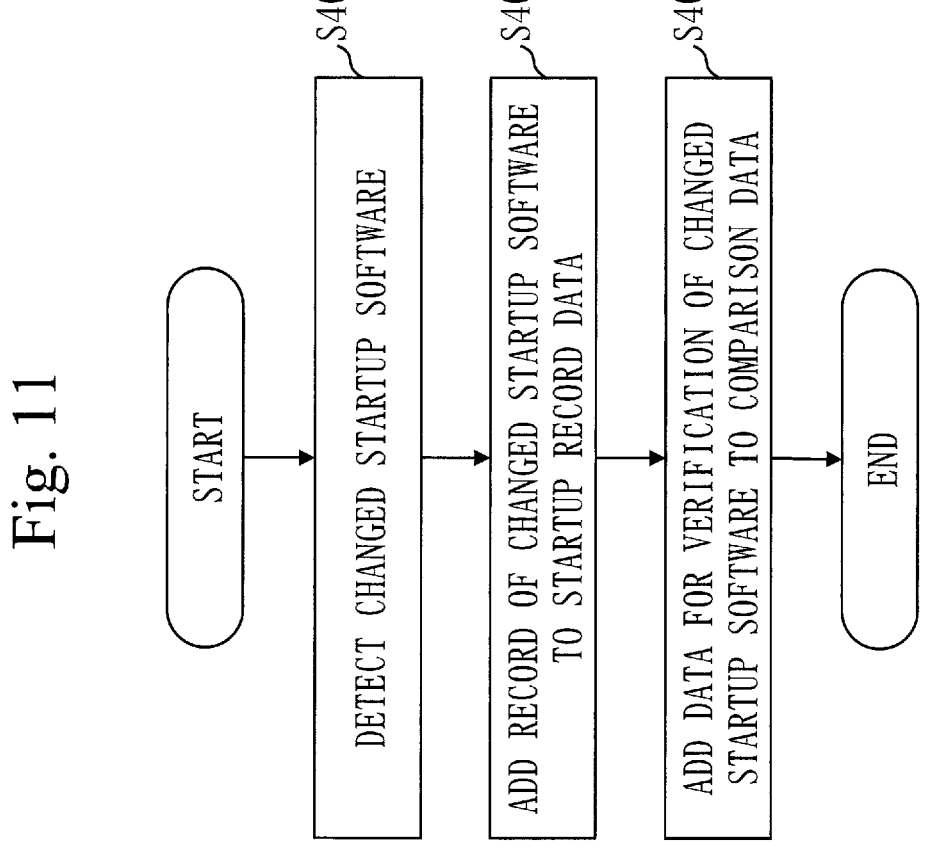
FIG. 11 is a flowchart illustrating operation of the information processing apparatus 100 according to Embodiment 3.

FIG. 11 is a flowchart illustrating an example of processing of the information processing apparatus 100 according to Embodiment 3. The processing in a case where the configuration change in software has been implemented while the information processing apparatus 100 is in operation, will be described with referring to FIG. 11.

(Step S401)

When the configuration change in software has been implemented, the software management unit 107 detects the implemented configuration change.

(Step S402)

The software management unit 107 adds to the startup record data 102, data indicating each of the start address and the software size of the software in which the configuration change has been implemented.

By executing processing of this step, the software in which the configuration change has been implemented is forcibly the verification subject at the next startup of the information processing apparatus 100.

(Step S403)

The software management unit 107 issues an order to the validity verification unit 101 to calculate data for verification corresponding to the software in which the configuration change has been implemented.

The validity verification unit 101 calculates the data for verification and updates the comparison data 104 using the calculated data for verification. That is, when the software management unit 107 detects the software in which the configuration change has been implemented, the validity verification unit 101 calculates the comparison data 104 corresponding to the software in which the configuration change has been implemented.

\*\*\*Description of Effects of Embodiment 3\*\*\*

The information processing apparatus 100 according to Embodiment 3 updates the startup record data 102 and the comparison data 104 in response to software in which a configuration change has been implemented. Therefore, the software in which the configuration change has been implemented while the information processing apparatus 100 is in operation, can be a verification subject of validity at the next startup of the information processing apparatus 100.

On the other hand, the software in which the configuration change has been implemented and which is not startup software, is excluded from the startup record data 102 by operation of the startup completion notification unit 105 and the startup record acquisition unit 106 indicated in Embodiment 2 at the next startup of the information processing apparatus 100. Accordingly, at the next next startup of the information processing apparatus 100, the software is no longer the verification subject of validity.

Further, the information processing apparatus 100 according to Embodiment 3 is suitable for a vehicle control apparatus as with the information processing apparatus 100 according to Embodiment 2.

OTHER EMBODIMENTS

The above embodiments can be freely combined, or any component of each of the embodiments can be modified. Alternatively, in each of the embodiments, any component can be omitted.

Alternatively, the embodiments are not limited to those presented in Embodiments 1 and 3, and various modifications can be made as needed. The procedures described using the flowcharts or the like may be suitably modified.

REFERENCE SIGNS LIST

10: HSM; 11: secure CPU; 12: cryptographic calculation engine; 13: secure storage; 20: storage device; 30: main CPU; 40: RAM; 50: processing circuit; 100: information processing apparatus; 101: validity verification unit; 102: startup record data; 103: software storage; 104: comparison data; 105: startup completion notification unit; 106: startup record acquisition unit; 107: software management unit.

The invention claimed is:

1. An information processing apparatus that verifies software comprising:
   processing circuitry:
   to verify validity of startup software by comparing verification subject data with comparison data, the verification subject data being data for verification calculated based on data stored in a storage place in a memory indicated in startup record data indicating the storage place where the startup software is to be stored, the startup software being executed at startup of the information processing apparatus, and the verification subject data being data for verification calculated at the startup of the information processing apparatus, the comparison data being data for verification calculated before the startup of the information processing apparatus based on the startup software, and the comparison data being data for verification used as a comparison subject of the verification subject data;
   to detect that software whose execution is to be started last among pieces of the startup software has been executed; and
   to acquire storage place data indicating the storage place of each software started up from the startup of the information processing apparatus until it is detected that the software whose execution is to be started last among pieces of the startup software, and to update the startup record data using the acquired storage place data.

2. The information processing apparatus according to claim 1, wherein
   the startup record data consists of data indicating a start address of the storage place and data indicating a data size of the startup software.

3. The information processing apparatus according to claim 1, wherein
   the data for verification is data indicating a hash value or a Message Authentication Code (MAC) of software corresponding to the data for verification.

4. The information processing apparatus according to claim 2, wherein
   the data for verification is data indicating a hash value or a Message Authentication Code (MAC) of software corresponding to the data for verification.

5. The information processing apparatus according to claim 1, wherein
   the processing circuitry detects software in which a configuration change has been implemented when the configuration change has been implemented to the software stored in the information processing apparatus while the information processing apparatus is in operation, and when the software in which the configuration change has been implemented is detected, the processing circuitry calculates comparison data corresponding to the software in which the configuration change has been implemented.

6. The information processing apparatus according to claim 2, wherein the processing circuitry detects software in which a configuration change has been implemented when the configuration change has been implemented to the software stored in the information processing apparatus while the information processing apparatus is in operation, and when the software in which the configuration change has been implemented is detected, the processing circuitry calculates comparison data corresponding to the software in which the configuration change has been implemented.

7. The information processing apparatus according to claim 3, wherein the processing circuitry detects software in which a configuration change has been implemented when the configuration change has been implemented to the software stored in the information processing apparatus while the information processing apparatus is in operation, and when the software in which the configuration change has been implemented is detected, the processing circuitry calculates comparison data corresponding to the software in which the configuration change has been implemented.

8. The information processing apparatus according to claim 4, wherein the processing circuitry detects software in which a configuration change has been implemented when the configuration change has been implemented to the software stored in the information processing apparatus while the information processing apparatus is in operation, and when the software in which the configuration change has been implemented is detected, the processing circuitry calculates comparison data corresponding to the software in which the configuration change has been implemented.

9. An information processing method executed by an information processing apparatus which is a computer that verifies software comprising:

verifying validity of startup software by comparing verification subject data with comparison data, the verification subject data being data for verification calculated based on data stored in a storage place in a memory indicated in startup record data indicating the storage place where the startup software is to be stored, the startup software being executed at startup of the information processing apparatus, and the verification subject data being data for verification calculated at the startup of the information processing apparatus, the comparison data being data for verification calculated before the startup of the information processing apparatus based on the startup software, and the comparison data being data for verification used as a comparison subject of the verification subject data;

detecting that software whose execution is to be started last among pieces of the startup software has been executed; and acquiring storage place data indicating the storage place of each software started up from the startup of the information processing apparatus until it is detected that the software whose execution is to be started last among pieces of the startup software, and updating the startup record data using the acquired storage place data.

10. A non-transitory computer readable medium storing an information processing program for causing an information processing apparatus which is a computer that verifies software to execute:

a validity verification process to verify validity of startup software by comparing verification subject data with comparison data, the verification subject data being data for verification calculated based on data stored in a storage place in a memory indicated in startup record data indicating the storage place where the startup software is to be stored, the startup software being executed at startup of the information processing apparatus, and the verification subject data being data for verification calculated at the startup of the information processing apparatus, the comparison data being data for verification calculated before the startup of the information processing apparatus based on the startup software, and the comparison data being data for verification used as a comparison subject of the verification subject data;

a startup completion notification process to detect that software whose execution is to be started last among pieces of the startup software has been executed; and a startup record acquisition process to acquire storage place data indicating the storage place of each software started up from the startup of the information processing apparatus until it is detected that the software whose execution is to be started last among pieces of the startup software, and to update the startup record data using the acquired storage place data.

* * * * *